United States Patent [19]

Cramer et al.

[11] 4,056,403
[45] Nov. 1, 1977

[54] SOLVENT COMPOSITION USED TO CLEAN POLYURETHANE FOAM GENERATING EQUIPMENT

[75] Inventors: Robert J. Cramer, West Haven; Maurice A. Raymond, Northford, both of Conn.

[73] Assignee: Olin Corporation, New Haven, Conn.

[21] Appl. No.: 690,448

[22] Filed: May 27, 1976

[51] Int. Cl.$^2$ ............................ C23G 3/04; B08B 3/04
[52] U.S. Cl. ................................. 134/22 R; 134/11; 134/38; 134/40; 252/166; 252/170; 252/171; 252/364; 260/648 R; 260/652.5 R
[58] Field of Search ............... 252/171, 170, 162, 364; 260/648, 652.5; 106/311; 134/11, 38, 40, 22 R

[56] References Cited

U.S. PATENT DOCUMENTS

| | | | |
|---|---|---|---|
| 2,153,895 | 4/1939 | McKittrick | 252/170 |
| 3,085,116 | 4/1963 | Kualner | 260/652.5 |
| 3,400,077 | 9/1968 | Orfeo | 252/171 |
| 3,619,295 | 11/1971 | Nishizaki | 134/38 X |
| 3,661,641 | 5/1972 | Vigh | 134/38 X |
| 3,764,384 | 10/1973 | Berni | 134/38 X |
| 3,789,007 | 1/1974 | Robinson | 252/171 |
| 3,904,430 | 9/1975 | Tipping | 252/171 X |
| 3,932,297 | 1/1976 | Clementson | 252/171 |
| 3,957,531 | 5/1976 | Tipping | 252/171 X |
| 3,988,256 | 10/1976 | Vandermey | 252/171 |

*Primary Examiner*—Mayer Weinblatt
*Attorney, Agent, or Firm*—F. A. Iskander; T. P. O'Day

[57] ABSTRACT

A solvent composition is disclosed which comprises a halogenated hydrocarbon and a monohydric alcohol. This composition is used to clean polyurethane foam generating equipment.

13 Claims, No Drawings

SOLVENT COMPOSITION USED TO CLEAN POLYURETHANE FOAM GENERATING EQUIPMENT

This invention relates to an improvement connected with the generation of polyurethane foam. More particularly, the invention relates to an improved solvent system and to its use in cleaning polyurethane foam generating equipment.

Polyurethane foam is prepared by mixing and reacting together, in the presence of a foaming agent, an organic polyisocyanate with a polyol. For the on-site generation of foam, a so-called portable foaming apparatus is used. A variety of such portable apparatus have been disclosed in the prior art. See for example U.S. Pat. Nos. 3,769,232 and 3,561,023.

Typically, a portable apparatus for the on-site generation of polyurethane foam comprises at least two reactants supply tanks, a gun head including a static mixer for mixing the reactants, and means for expelling the reactants from their respective tanks, through the static mixer and onto a surface or into a mold where the foaming reaction takes place.

In addition, the portable foaming apparatus usually includes, as an essential or desirable component, a solvent supply tank. The solvent is used in between or after repeated foaming operations, to clean the static mixer and purge it of residual material that might otherwise accumulate inside the mixed and interfere, chemically or physically, with subsequent foaming operations. Thus, the outlet of the solvent supply tank is linked to the static mixer via a valved conduit, and usually the same means that is used to propel the reactants from their supply tanks is connected to the solvent supply tanks for intermittently propelling the solvent through and out of the static mixer.

Typical of the solvents that have been employed for this purpose are the halogenated hydrocarbons, a commonly-used example of which is methylene chloride. For conventional prior art applications, wherein the solvent is used once and thereafter disposed of, the halogenated hydrocarbons are usually satisfactory. However, they are generally unsatisfactory for repeated use; for it has been found, according to the invention, that the halogenated hydrocarbons do not retain their solvent properties after being used once or a few times. For example, they usually form precipitates or lose their homogeneity and therefore cannot be effectively used again.

Now a select solvent composition has been found which is characterized by a relatively low toxicity and a substantially improved capacity as a solvent for polyurethane foam-forming chemicals. As such, it can be used repeatedly to clean the apparatus for equipment utilized in processing and/or foaming these chemicals. According to the invention, this composition is comprised of (a) a halogenated hydrocarbon and (b) a monhydric alcohol.

Further according to the invention, an improvement is provided in the prior art method wherein an organic solvent is used to clean polyurethane-foam generating equipment. The improvement resides in using, as the solvent, the composition described above.

More in detail, the first component of the solvent composition of the invention is a halogenated hydrocarbon. The desirability of this component is predicated on the ready availability and relative low cost of various halogenated hydrocarbons, and further on the fact that, by virtue of the halogen therein, these materials have relatively low flammability.

The halogenated hydrocarbons used in the composition of the invention include aromatic and aliphatic materials, although the aliphatic halogenated hydrocarbons are generally preferred. Furthermore, the halogen in this component can be chlorine, bromine, iodine, fluorine or a mixture thereof.

Usually, the halogenated aliphatic hydrocarbons, which may be saturated or unsaturated, cyclic or acyclic, have 1–12 carbon atoms, and, preferably, they contain only carbon, hydrogen, and halogen atoms in the molecule. Illustrative materials include the following:

| | |
|---|---|
| Methyl chloride | 2-Chloropentane |
| Methylene chloride | 3-Chloropentane |
| Chloroform | 3-Bromopentane |
| Methyl iodide | Isoamyl bromide |
| Bromoform | Isoamyl iodide |
| Ethyl bromide | Neopentyl bromide |
| Carbon tetrachloride | n-Hexyl bromide |
| n-Propyl chloride | 3-Bromohexane |
| Trifluoromonochloromethane | 2-Chloro-2-methylhexane |
| n-Propyl bromide | 1-Iodo-2,4-dimethylpentane |
| Dichlorodifluoromethane | 2-Bromooctane |
| n-Propyl iodide | 2-Chloro-2-methylheptane |
| 1,1,1-Trichloroethane | n-Nonyl chloride |
| Isopropyl bromide | n-Nonyl bromide |
| Isopropyl iodide | n-Decyl chloride |
| n-Butyl chloride | n-Dodecyl bromide |
| n-Butyl bromide | Cyclopentyl chloride |
| Isobutyl iodide | Cyclohexyl fluoride |
| n-Amyl fluoride | 1-Chloro-2-methylcyclopentane |
| n-Amyl chloride | 1-Chloro-1,3-dimethylcyclopentane |
| Methylene bromide | Allyl bromide |
| Methylene iodide | 1,2-Dichloro-1-propene |
| Trifluoroiodomethane | 1,1-Dibromo-1-pentene |
| Bromodichloromethane | Dichloroacetylene |
| Propylidene dichloride | 1-Bromo-1-hexyne |
| Trimethylene bromide | |

The halogenated aromatic hydrocarbons, which include alkyl and haloalkyl-substituted aromatic materials, again preferably contain only carbon, hydrogen and halogen atoms in the molecule; and they usually have from 6 to 12 carbon atoms. Illustrative of these are the following:

| | |
|---|---|
| Fluorobenzene | m-Methylbenzyl chloride |
| Chlorobenzene | Chloro-p-xylene |
| Bromobenzene | 4-Phenylbutyl chloride |
| Iodobenzene | m-Bromo-n-butylbenzene |
| Benzyl fluoride | o-Chlorobiphenyl |
| Benzyl chloride | Phenylchloroacetylene |
| o-Chlorotoluene | 1-Phenyl-5-chloro-1-pentyne |
| α-Chloroethylbenzene | |

As indicated earlier, the preferred halogenated hydrocarbons for use according to the invention are aliphatic, such as illustrated above, particularly those having 1–8, and still more preferably, 1–4 carbon atoms. For reasons of low cost and ready availability, the most preferred materials are the saturated, halogenated aliphatic hydrocarbons which contain 2 or more halogens in the molecule. Those in which the halogen is chlorine are especially preferred, such as methylene chloride and 1,1,1-trichloroethane.

The other component of the solvent composition of the invention is a monohydric alcohol. According to the invention, the use of such a material, in combination with the halogenated hydrocarbon, is critical. This is because it has been found that the combination has a markedly improved solvent capacity for polyurethane foam-forming chemicals than do halogenated hydrocarbons alone. The criticality of using a monohydric alcohol is further predicted on the additional discovery that similar materials are less effective. For example, it has been found that combinations of a halogenated hydrocarbon with other oxygen-containing solvents, such as methyl ethyl ketone, has a substantially lower solvent capacity for polyurethane foam forming chemicals than combinations of halogenated hydrocarbons and monohydric alcohols.

The monohydric alcohol component can be a simple alcohol, a hydroxy ether or a hydroxy polyether. Thus the term "monohydric alcohol", as used in the specification and claims herein, is intended to encompass all these materials.

As with the halogenated hydrocarbon component, the monohydric alcohol component can be aliphatic or aromatic, although the aliphatic alcohols are preferred. Furthermore, the monohydric alcohol preferably contains only carbon, hydrogen, oxygen and optionally, halogen in the molecule. Preferably, the oxygens in the molecule are limited to hydroxy and ether oxygens. For reasons of economy, the use of monohydric alcohols which contain only carbon, hydrogen and oxygen in the molecule, i.e., non-halogenated monohydric alcohols, is particularly preferred.

The aliphatic monohydric alcohols which are used in the composition of the invention may be saturated or unsaturated, cyclic or acyclic, although the saturated acyclic materials are generally preferred. And they may vary in carbon atom content over a wide range, e.g., 1–20, depending for instance on whether a long-chain monohydric polyether is used. Generally, in the case of monohydric alcohols which are free of ether linkages, these should preferably contain from 1 to 8, and more preferably 1–4, carbon atoms in the molecule; whereas, in the case of the monohydric mono- and polyethers, these should preferably contain 3–14 carbon atoms.

Illustrative of the aliphatic monohydric alcohols that may be used according to the invention are the following:

| | |
|---|---|
| Methanol | Dipropylene glycol monomethyl ether |
| Ethanol | Tripropylene glycol monomethyl ether |
| Isopropanol | Allyl alcohol |
| n-Butanol | 3-Penten-1-ol |
| n-Pentanol | Cyclobutanol |
| n-Hexanol | Cyclohexanol |
| Ethylene glycol monomethyl ether | 2-Octanol |
| Ethylene glycol monoethyl ether | 5-Nonanol (di-n-butyl-carbinol) |
| Ethylene glycol monobutyl ether | 2-Methoxy-1-propanol |
| Diethylene glycol monomethyl ether | 1-Methoxy-2-propanol |
| Diethylene glycol monoethyl ether | 4-Methoxy-1-butanol |
| Diethylene glycol monobutyl ether | 3-Methoxy-2-methyl-1-propanol |
| Triethylene glycol monomethyl ether | 1,3-Dimethoxy-2-propanol |
| Triethylene glycol monoethyl ether | 5-Methoxy-1-pentanol |
| Triethylene glycol monobutyl ether | 3-Methoxycyclohexanol |
| Propylene glycol monomethyl ether | |

Aliphatic monohydric alcohols which are especially desirable for use according to the invention include (1) the simple lower alcohols which contain 1–4 carbon atoms and are free of ether linkages such as methanol, ethanol, a propanol and a butanol and (2) the di- and triether alcohols containing 3–10 carbon atoms such as triethylene glycol monomethyl ether, triethylene glycol monoethyl ether and triethylene glycol monobutyl ether.

The aromatic monohydric alcohols may be alkyl and/or haloalkyl substituted, and the hydroxy group therein may be ring substituted or alkyl chain substituted. They usually range in carbon atom content from 6 to 12 and include, for example, phenol, the benzyl alcohols and their alkyl-substituted derivatives, the phenyl alkanols and so forth.

The two essential components of the solvent composition of the invention may be used in any suitable relative proportions. However, usually such proportions are employed as to provide a weight ratio, of halogenated hydrocarbon to monohydric alcohol ranging from about 1:1 to about 12:1 and preferably from about 2:1 to about 10:1. From a practical standpoint, a more desirable range is from about 3:1 to about 8:1, and in accordance with the most preferred embodiments of the invention, such relative proportions of halogenated hydrocarbon and monohydric alcohol are used as to provide a weight ratio from about 3.5:1 to about 6:1, respectively.

The solvent composition of the invention is simply prepared by combining and mixing together the halogenated hydrocarbon and the monohydric alcohol in the desired or specified proportions. The mixture would then be ready to use as a solvent for cleaning polyurethane foam generating equipment. The mixture usually remains homogeneous and does not undergo phase separation on prolonged storage.

In practicing the improved method of the invention, wherein the solvent composition described herein is used as a solvent for cleaning a polyurethane foam generating apparatus or a segment thereof, any suitable prior art cleaning technique or method may be used. Thus, except for the requirement of using the solvent composition specified herein, the method of the invention is not limited to any particular cleaning process or mode of operation. For example, the cleaning operation may be carried out by rinsing or flushing the entire foaming apparatus, after the foam forming chemicals have been exhausted, with the solvent; or, the solvent may be periodically injected under pressure through the mixer portion of the foaming apparatus in order to purge it of residual unreacted or partially foam forming materials.

In accordance with a preferred embodiment of the invention, the solvent composition described herein is used repeatedly in cleaning polyurethane foam generating equipment. That is, after each individual use, the solvent composition, rather than being disposed of and thus wasted, is retained in a container and recycled for use again and again in subsequent cleaning operations. To this end, a solvent recirculating system may be used such as described in co-pending U.S. patent application Ser. No. 656,157, filed by J. F. Zwirlein on Feb. 9, 1976. The entire disclosure of this application is incorporated herein by reference. By virtue of its stability and improved solvent capacity, the solvent composition of the invention is particularly suited for use in this type of system. It is to be realized, however, in connection with this embodiment of the invention that the solvent composition described herein cannot be used over and over again ad infinitum. Rather, after a great number of repeated uses, it may eventually become contaminated with solid matter or its solvent capacity may degrade to such a point that it cannot be effectively used again. When this happens, the solvent composition must be replenished, purified or replaced.

The following examples are provided to illustrate the invention. In these examples all parts and percentages are by weight unless otherwise specified. For testing the solvent capacity of the various solvent compositions illustrated in the examples, a polyurethane foam forming formulation is uniformly used. This formulation is supplied in two separate components which had been pre-blended in separate containers. The first component, referred to as the "A Component", consisted of a blend of 14.9 parts of trichloromonofluoromethane and 85.1 parts of an isocyanate-terminated prepolymer. The latter was the product of mixing and reacting together 97.7 parts of polymethylene polyphenylisocyanate and 2.3 parts of a polyether polyol having an average hydroxyl number of 365. This polyether polyol is a product of reacting 4,4,4-trichloro-1,2-epoxybutane with an equi-molar mixture of ethylene glycol and dextrose. As for the polymethylene polyphenylisocyanate, this is a commercial product, purchased under the trandemark "PAPI 135", which is characterized by an amine equivalent of 134 and an average NCO functionability between 2.6 and 2.7.

The second component of the polyurethane foam forming formulation is referred to as the "B Component". It consisted of a blend of the following ingredients in the indicated relative proportions:
 1. 57.24 parts of a polyether triol having a molecular weight of 5803 which is the product of condensing glycerin first with 90.6 moles of propylene oxide and then with 12.7 moles of ethylene oxide;
 2. 6.78 parts of polyether diol having a molecular weight of 2000 which is the product of condensing dipropylene glycol first with propylene oxide and then with 20 moles of ethylene oxide;
 3. 15.6 parts of trichloromonofluoromethane;
 4. 12.05 parts of water;
 5. 7.36 parts of dimethylethanolamine catalyst;
 6. 1.51 parts of a silicone-glycol copolymer surfactant.

This is a commercial urethane foam surfactant, product of Union Carbide, sold under the trademark or designation "L-540".

EXAMPLE 1

A solvent composition was prepared by mixing together 40 parts of 1,1,1-trichloroethane and 10 parts of methanol. The following procedure was then used to test the capacity of this mixture as a solvent for polyurethane foam forming chemicals.

A 50-gram sample of the mixture was placed in a small, stoppered bottle. There was then added and admixed therewith 1 ml. of the polyurethane foam forming composition described above, specifically 0.5 ml. of the A Component and 0.5 ml. of the B Component. On visual examination, the mixture was a homogeneous, clear solution. After storage at room temperature for 3 days, the solution remained stable, exhibiting no precipitation, gel-formation or viscosity increase.

At the end of the three day period, another 1 ml. dose of the polyurethane foam forming formulation was added and mixed in. Again no change was observed after the solution was allowed to stand for one day at room temperature. This procedure was repeated two more times with no change being observed. Rather, the solution remained stable with no precipitation, gelling or noticeable change in viscosity.

EXAMPLE 2

A solvent composition was prepared, following the procedure of Example 1, using 40 parts of methylene chloride and 10 parts of triethylene glycol monoethyl ether, $C_2H_5O(C_2H_4O)_3H$. A 50 gram sample of this composition was mixed with 2 mls. of the polyurethane foam forming composition described above, specifically 1 ml. of the A Component and 1 ml. of the B Component. On visual examination, the mixture was a homogeneous, clear solution which did not exhibit any precipitation, gel-formation or viscosity increase on being stored overnight at room temperature.

COMPARISONS 1-2

The procedure of Example 1 was repeated except that instead of 40 parts of 1,1,1-trichloroethane and 10 parts of methanol, 50 parts of 1,1,1-trichloromethane alone were used in Comparison 1 and 50 parts of methylene chloride alone were used in Comparison 2.

In the case of each of the two comparisons, gellation and/or precipitate formation were observed after the initial addition of the first dose of polyurethane foam forming formulation. This demonstrates the improved solvent capacity which obtains by using a solvent mixture of a halogenated hydrocarbon and a monohydric alcohol, per Example 1, as compared with using the same total amount of a halogenated hydrocarbon alone.

EXAMPLES 3-4

The procedurre of Example 1 was followed except that instead of 10 parts of methanol, 10 parts of 1-butanol were used in Example 3 and 10 parts of triethylene glycol monomethyl ether, $CH_3O(C_2H_4O)_3H$, were used in Example 4. In both cases, the results were identical to those of Example 1. That is, after the addition of 4 1-ml. does of the polyurethane foam forming formation, the solution remained clear and homogeneous with no evidence of any precipitation, gellation or viscosity increased.

COMPARISONS 3-5

The procedure of Example 1 was followed except that instead of 10 parts of methanol, equal amounts of perchloroethylene, methyl ethyl ketone and cellulose acetate were used in Comparisons 3, 4 and 5, respectively. In all three cases, the solution failed, as evidenced by precipitate formation, at the end of the three days period following the first 1-ml. dose addition of the polyurethane foam forming formulation. These comparisons demonstrate the improvement which results from using a monohydric alcohol, as the second component in the solvent composition, as compared with using various other organic solvents.

EXAMPLE 5

Three solvent compositions, identified as 5-1, 5-2 and 5-3, were prepared using 10%, 15% and 20%, respectively, of methanol in 1,1,1-trichloroethane. In the case of each of the three compositions, the following procedure was employed to test solvent capacity for polyurethane chemicals.

A 50-gram sample was placed in a small, stoppered bottle. To this, there were added and mixed therewith, at specified intervals, three consecutive doses of the polyurethane foam forming formulation described above. The first dose was 3 mls. (1.5 mls. of Component A and 1.5 mls. of Component B), and the other two doses were 2 mls. each. After each addition, and at the end of each interval, the content of the bottle was visually examined. If no precipitation or gelling was observed, the sample was given a "Pass" rating; whereas if precipitation or gelling occurred, the sample was given a "Fail" rating. Details of this test for each sample, including the results, are provided in Table I below.

EXAMPLE 6

This example is a repetition of Example 5 except that in lieu of methanol, triethylene glycol monoethyl ether, $C_2H_4O(C_2H_4O)_3H$, was used. The results are provided in Table I wherein the three illustrative solvent compositions corresponding to 5-1, 5-2 and 5-3 in Example 5 are identified as 6-1, 6-2 and 6-3.

EXAMPLE 7

Again the procedure of Example 5 was followed using, instead of methanol, triethylene glycol monobutyl ether. The results are provided in Table I.

TABLE I

| Sample | % Alcohol* | 1st Dose | + 16 Hrs. | 2nd Dose | + 6 Hrs. | 3rd Dose | + 4 Days |
|--------|-----------|----------|-----------|----------|----------|----------|----------|
| 5-1 | 10 | PASS | PASS | PASS | PASS | FAIL | FAIL |
| 5-2 | 15 | PASS | PASS | PASS | PASS | PASS | PASS |
| 5-3 | 20 | PASS | PASS | PASS | PASS | PASS | PASS |
| 6-1 | 10 | PASS | FAIL | FAIL | FAIL | FAIL | FAIL |
| 6-2 | 15 | PASS | PASS | PASS | PASS | PASS | FAIL |
| 6-3 | 20 | PASS | PASS | PASS | PASS | PASS | PASS |
| 7-1 | 10 | PASS | PASS | FAIL | FAIL | FAIL | FAIL |
| 7-2 | 15 | PASS | PASS | PASS | PASS | PASS | FAIL |
| 7-3 | 20 | PASS | PASS | PASS | PASS | PASS | PASS |

*The particular alcohols used were methanol in Samples No. 4, triethylene glycol monoethyl ether in Samples No. 5 and triethylene glycol monobutyl ether in Samples No. 6.

EXAMPLE 7

A solvent composition was prepared by mixing together 50 parts of 1,1,1-trichloroethane and 10 parts of triethylene glycol monoethyl ether. This composition was successfully used, as a recirculating cleaning solvent, in a portable polyurethane foam generating apparatus identical to the one described in the above-noted Zwirlein patent application Ser. No. 656,157. The polyurethane foam forming formulation processed through the apparatus was identical to that described above. Thirty foam shots were made, with intermittent cleaning by running the above-described solvent composition through the foaming head and back to its supply tank. The gun head was then visually examined and found to be completely clean and free of fouling or residual matter. After the last cleaning cycle, the solvent composition itself was visually examined. It was still clear, homogeneous, and free of any cloudiness or precipitation.

What is claimed is:

1. In a method for cleaning polyurethane foam generating equipment which comprises purging or rinsing said equipment or a portion thereof with a solvent, the improvement of using as said solvent a composition which is comprised of
    a. a halogentated aliphatic hydrocarbon having 1-12 carbon atoms and containing only carbon, hydrogen, and halogen atoms in the molecule and
    b. an aliphatic monohydric alcohol having 1-20 carbon atoms and containing only carbon, oxygen, hydrogen and optionally halogen atoms in the molecule, the weight ratio of (a):(b) ranging from about 1:1 to about 12:1.

2. The method of claim 1 wherein said weight ratio ranges from about 3:1 to about 8:1.

3. The method of claim 1 wherein said aliphatic monohydric alcohol is selected from the group consisting of methanol, ethanol, propanol, butanol, triethylene glycol monomethyl ether, triethylene glycol monoethyl ether, and triethylene glycol monobutyl ether.

4. The method of claim 1 wherein said halogenated aliphatic hydrocarbon is methylene chloride or 1,1,1-trichloroethane.

5. The method of claim 1 wherein said aliphatic monohydric alcohol contains only carbon, oxygen, and hydrogen atoms in the molecule.

6. The method of claim 5 wherein said aliphatic monohydric alcohol is either free of ether linkages and contains 1-8 carbon atoms or contains one or more ether linkages and 6-12 carbon atoms.

7. The method of claim 6 wherein said halogenated aliphatic hydrocarbon contains 1-4 carbon atoms and at least two halogen atoms.

8. The method of claim 7 wherein said ratio ranges from about 2:1 to about 10:1.

9. The method of claim 8 wherein the halogen in said halogenated aliphatic hydrocarbon is chlorine.

10. The method of claim 9 wherein said ratio ranges from about 3:1 to about 8:1.

11. The method of claim 10 wherein said halogenated aliphatic hydrocarbon is methylene chloride or 1,1,1-trichloroethane and said aliphatic monohydric alcohol is selected from the group consisting of methanol, ethanol, propanol, butanol, triethylene glycol monomethyl ether, triethylene glycol monoethyl ether, and triethylene glycol monobutyl ether.

12. The method of claim 11 wherein said halogenated aliphatic hydrocarbon is 1,1,1-trichloroethane.

13. The method of claim 12 wherein said ratio ranges from about 3.5:1 to about 6:1.

* * * * *